3,210,321
POLYETHYLENE STABILIZED WITH NITRATES
Carroll F. Doyle, Ellicott City, Luther O. Young, Baltimore, and Thomas Bieniek, Glen Burnie, Md., assignors to W. R. Grace & Co., New York, N.Y., a corporation of Connecticut
No Drawing. Filed July 21, 1961, Ser. No. 125,674
3 Claims. (Cl. 260—45.75)

This invention relates to thermoplastic resin compositions and more particularly to polyolefin resin compositions which are highly resistant to degradation caused by the action of light thereon. This invention also relates to a method of rendering polyolefin resins resistant to discoloration and/or degradation of physical properties when exposed to natural or artificial light.

It is a well-known fact that polyolefin resins are subject to degradation and/or discoloration when exposed to light and/or heat over a period of time. Degradation of the resin is evidenced by loss in such properties as tensile strength, stress-crack resistance, elasticity and electrical insulating properties. Discoloration will render the resin unsuitable for use in many technical applications as well as in consumer products where eye-appeal to the customer is critical. Such undesirable results will almost invariably occur when unstabilized polyolefin resins are subjected to the influence of natural or artificial light.

The prior art has suggested many ways of avoiding the problems noted above. One effective method of rendering polyolefin light stable has been by incorporation into the resin of various amounts of carbon black. While this will ordinarily avoid degradation caused by light, it obviously is unsuitable for those applications where a black composition cannot be used or is not desired. Other prior art proposals have suggested the use of a wide variety of organic compounds as ultra-violet absorbers in polyolefin compositions. However, many of these suggested additives, while serving the desired purpose at least temporarily, are highly or significantly incompatible with the polyolefin resin base when incorporated therein in the required amounts. Consequently, these additives will exude, migrate to the surface, or "sweat-out" of the composition and become deposited on the surface thereof, thus creating an unsightly appearance and losing much of their effectiveness. Other suggested organic ultra-violet absorbers, while stabilizing the polyolefin resin to the extent of preventing degradation of strength properties due to the action of light, have the disadvantage of accelerating discoloration thereof.

It is an object of this invention to obviate many of the prior art problems noted above. It is a further object of this invention to provide polyolefin compositions which are stable to natural or artificial light by the incorporation therein of compounds which will not exude or "sweat-out" of the composition. Another object of this invention is to provide a method of rendering polyolefin resins stable to the action of natural or artificial light.

This invention is based upon the discovery that polyolefin resins can be stabilized against degradation of strength properties and development of color by incorporating therein a small amount of a metal nitrate, a polyvalent metal ammonium nitrate, a polyvalent metal cerous nitrate or a copper or nickel di- or tri-isopropanolamine nitrate.

The term "polyolefin" as used herein is meant to include the normally solid homopolymers of alpha-monoolefins such as ethylene, propylene, 1-butene, 1-pentene, 1-hexene, 5-methyl-1-pentene, 4-methyl-1-pentene, 3-methyl-1-butene and other like alpha-monoolefins containing from 2 to 8 carbon atoms; as well as normally solid copolymers of one or more of these named alpha-monoolefins. Also included are copolymers of only one or more of the above alpha-monoolefins and a minor amount, not to exceed about 15 percent by weight of the olefin, of another ethylenically unsaturated comonomer such as styrene, vinyl chloride, vinyl acetate, methyl and ethyl acrylate or methacrylate, vinyl alkyl ethers, a vinylidene halide, or other like compound. The polyolefins can be those produced by any of the known processes including the high-pressure, and the more recent low-pressure processes known as the Phillips process and Ziegler process.

The term "metal nitrate" as used herein is meant to include the nitrate salt of any of the following metals: Group I metals such as lithium, sodium, potassium or copper and the like; Group II metals such as magnesium, calcium, barium, strontium, zinc, or cadmium and the like; Group III metals such as scandium, aluminum, gallium, yttrium, cerium, lanthanum, neodymium, or other rare earth metals and the like; Group IV metals such as lead, titanium, zirconium and the like; Group V metals such as vanadium, niobium, antimony, bismuth and the like; Group VI metals such as chromium, molybdenum, tungsten and the like; Group VII metals such as manganese and the like and Group VIII metals such as iron, cobalt or nickel and the like. The term "metal nitrate" as used herein also is meant to include ammonium nitrate. A mixture of any two or more of the above named nitrates may be used, if desired. In mixtures of ammonium nitrate and metal nitrate, the metal nitrate portion should be a polyvalent metal and can be any one of the polyvalent metals listed hereinabove. The term "polyvalent metal ammonium nitrates" also includes within its scope, true double salts as well as mixtures of the two separate nitrates prepared by co-crystallization from solutions containing the two salts.

The term "polyvalent metal cerous nitrates" as used herein includes true double salts and also co-crystallized mixtures of cerous nitrate and a polyvalent metal nitrate. The polyvalent metal may be any one of the polyvalent metals listed hereinabove.

The terms "cupric di- or tri-isopropanolamine nitrate" and "nickel di- or tri-isopropanolamine nitrate" include co-crystallized complex products derived from solutions containing cupric nitrate or nickel nitrate and diisopropanolamine or triisopropanolamine. A convenient generic term for these cocrystallized products is copper or nickel poly(isopropanol) amine nitrates.

The amount of nitrate used in this invention is from 0.25 to about 2.5 percent, by weight, of the polyolefin resin in the composition. The nitrate selected may be used in an amount greater than about 2.5 percent by weight, if desired, but such amounts do not ordinarily further enhance the light stability of the polyolefin. The preferred amount of nitrate is between about 0.50 and about 2.0 percent by weight of the polyolefin resin.

The nitrate to be used can be incorporated and dispersed in the polyolefin resin in any suitable manner. The nitrate may be dissolved in a suitable solvent such as water, ethanol, propanol, methanol or the like and the solution blended with polyolefin resin in pelleted, granulated, or powdered form in such quantities as to provide the required amount of nitrate. Blending should be continued for a sufficient period of time to obtain an intimate and thorough dispersion of the nitrate solution. The blend of resin and solution can then be slowly dried so as to evaporate the solvent without entraining any of the added nitrate. The dried blend is then further worked into a homogeneous mass by milling on a two-roll mill, by extruding, by mixing in a Banbury-type mixer or by simply manually working the resin-nitrate blend on a hot plate; in any case, under such conditions as to flux the resin and mechanically mix the blend. Temperatures for working the resin-nitrate blend into a homogeneous mass must in all cases be below those temperatures at which the resin or metal ammonium nitrate would be thermally degraded or decomposed, as will be obvious to those skilled in the art.

The nitrate compounds can also be incorporated in powdery form when thus available. This mode of incorporation involves nothing more than mixing the powdered nitrate and the resin, preferably also in powdery form or as relatively small uniform pellets, in the proper proportions. Mixing can be accomplished in any suitable type of agitating blender or stirred vessel and again should be for a sufficient period of time to thoroughly disperse the nitrate powder in the resin mass. The resin-powder mixture is then mechanically worked into a homogeneous mass in the manner described above.

The nitrates can also be incorporated into polyolefin resins by mixing the two materials in bulk amounts in the required proportions and mechanically working into a homogeneous mass in the manner described above. As this method of incorporating the nitrates usually requires extensive mechanical working in order to obtain a homogeneous mass and is thus time consuming, it is generally not the preferred method.

The nitrate compounds used in this invention are generally known and many are commercially available. Methods of preparing the co-crystallized polyvalent metal ammonium nitrates, polyvalent metal cerous nitrates, cupric di- and tri-isopropanolamine nitrate and nickel di- or tri-isopropanolamine nitrate are illustrated in some of the examples found below. It is to be noted, however, that the invention is not intended to be limited by these examples, since nitrates of the classes specified are suitable regardless of how prepared. It is to be understood that, if desired, the stabilized polyolefin compositions of this invention may include modifiers, plasticizers, lubricants, pigments or other colorants, antistatic agents, antioxidants, fillers and the like.

This invention will be further illustrated by the following non-limitative specific examples. In the examples the light stability of the polyolefin-nitrate compositions was determined in an accelerated exposure method utilizing an Atlas Color Fade-Ometer, Type FDA-R. Test specimens of untreated resin and of resin containing nitrate stabilizer were prepared, each having overall dimensions of about 2¾ inches x 4 inches x .025 inch. These specimens were placed in the Fade-Ometer in such a manner as to expose an area of about 1¾ inches x 2½ inches. Exposure conditions are defined in the examples. The time to failure of each test specimen was then determined. The specimens were tested for failure by folding in half and creasing at the fold by applying manual pressure with the fingers. If the specimen broke when folded or exhibited appreciable surface cracking in the creased area, it was considered to have failed.

In each of the examples, the normally solid polyolefin tested was polyethylene resin having a density of about 0.96 and a melt index of about 0.70. The invention is equally applicable to other polyethylene resins as well as to any of the other normally solid polyolefin resins mentioned hereinabove, as previously explained.

EXAMPLE I

Preparation of cupric ammonium nitrate

Two hundred grams of copper nitrate trihydrate, $Cu(NO_3)_2 \cdot 3H_2O$, and 200 grams of ammonium nitrate were dissolved in 500 milliliters of water in an open beaker. The solution was moderately heated until sufficient water had been evaporated therefrom to cause the initiation of a crystallization. The beaker was then placed in an ice bath, crystallization was allowed to go to completion and the crystals filtered off. The remaining mother liquor was then further heated at a moderate temperature until a second crystallization began. The beaker was then again removed from the source of heat and placed in an ice bath, where the crystallization was completed. These crystals were filtered off and dried. This product was designated cupric ammonium nitrate. Upon examination it appeared to be a coprecipitated mixture of cupric nitrate and ammonium nitrate.

In a similar manner the following metal ammonium nitrates were prepared:

>Aluminum ammonium nitrate
>Manganous ammonium nitrate
>Cobaltous ammonium nitrate
>Ferric ammonium nitrate
>Zinc ammonium nitrate
>Ceric ammonium nitrate Some of these salts upon examination appeared to be true double salts whereas others were apparently coprecipitated mixtures. In any event, however, all were effective in improving the light stability of polyethylene as is demonstrated in the examples below.

EXAMPLE II

Preparation of rare earth ammonium nitrate

Two hundred grams of rare earth sulfate (a commercial product containing mixed rare earths) was dissolved in 200 milliliters of water and the solution filtered to remove any insoluble residual matter. The pH of the filtrate was adjusted to about 10 by slowly adding an aqueous ammonia solution. Under these conditions a precipitate of rare earth hydroxides was formed. This precipitate was filtered out of the solution and washed with water adjusted to a pH of 9 by addition thereto of ammonia until it was free of occluded sulfate. The filter cake of rare earth hydroxides was slurried in 115 milliliters of water and 122.3 milliliters of nitric acid having a specific gravity of 1.47 was added to the slurry. The resultant solution having a pH of about 3.5, was heated to 90° centigrade and filtered to remove any undissolved matter. To this solution of rare earth nitrates there was added, with stirring, 67.5 grams of ammonium nitrate. The solution containing the mixed nitrates was then concentrated by evaporation until crystallization began to occur, after which the solution was cooled to below room temperature in an ice bath and crystallization permitted to proceed to completion. The co-crystallized product, designated rare earth ammonium nitrate, was then filtered off and dried.

Cerium-free rare earth ammonium nitrate is prepared in the same manner with the exception that the initial slurry of rare earth hydroxides is first treated with concentrated hydrochloric acid to obtain a pH of about 1.5 thereby dissolving all except cerium hydroxide which is filtered out. The cerium-free solution of rare earth chlorides is then reprecipitated with sodium hydroxide in order to give a cerium free mixture of rare earth hydroxides which can be dissolved in nitric acid and co-crystallized with ammonium nitrate as above.

The separately recovered filter cake of cerium hydroxide can be used to prepare cerium ammonium nitrate in the same manner.

Some of the individual rare earth ammonium nitrates as, e.g., lathanum ammonium nitrate and neodymium ammonium nitrate, are commercially available compounds.

EXAMPLE III

Preparation of manganous cerous nitrate

A 50 percent aqueous solution containing 226 grams of manganous nitrate hexahydrate was diluted with 50 milliliters of water. The solution was moderately heated and stirred while there was added thereto about 114 grams of cerous nitrate hexahydrate. The solution was concentrated to about one-half its original volume and then cooled on ice to recover a crystallized product which was filtered off and dried at about 65° centigrade under a vacuum of about 28 inches of mercury. The filtrate was then further concentrated until a second crystallization began, after which it was again cooled on ice until crystallization was complete and the crystals filtered and dried as before. Portions of the two crystallization products were calcined and analyzed for oxide content. Results were substantially identical, so that the products were considered to be the same and were combined into a single sample designated manganous cerous nitrate. This product on examination appeared to be a true double salt.

EXAMPLE IV

*Preparation of aluminum cerous nitrate*

About 57.5 grams of aluminum nitrate nonahydrate and 43.4 grams of cerous nitrate hexahydrate were dissolved in 50 milliliters of water. The solution was concentrated by evaporation until crystallization began to occur. At this point the solution was cooled until crystallization was complete and then filtered. The crystalline product was dried in a dessicator over phosphorous pentoxide for two days. This dried product was designated aluminum cerous nitrate.

In the same manner as described in Examples III and IV above, numerous polyvalent metal cerous nitrates can be prepared such as:

Nickel cerous nitrate
Cupric cerous nitrate
Cobaltous cerous nitrate and the like. All are suitable for use as light stabilizers for polyethylene.

EXAMPLE V

*Preparation of cupric diisopropanolamine nitrate*

Fifty grams of cupric nitrate trihydrate were dissolved in 50 milliliters of warm water. In a separate container, a solution of 53.2 grams of diisopropanolamine in 50 milliliters of water was prepared. The diisopropanolamine was slowly added, with stirring, to the nitrate solution. When this addition was completed, an additional 22.8 grams of diisopropanolamine solution of the same concentration was stirred in. A clear, deep blue solution was formed, which was filtered to remove residual impurities. This solution was then concentrated by moderately heating until crystallization began to occur, after which it was cooled on ice until crystallization was complete and the light blue crystal product filtered off and dried. The product was designated cupric diisopropanolamine nitrate.

Cupric triisopropanolamine nitrate is prepared in the same manner. This product is a deep green, semi-plastic mass, which prior to drying, is washed with isooctane to remove occluded unreacted triisopropanolamine.

Nickel diisopropanolamine nitrate and nickel triisopropanolamine nitrate are prepared in substantially the same manner.

EXAMPLE VI

*Light stabilization of polyethylene with cupric ammonium nitrate*

Two grams of cupric ammonium nitrate, prepared as described in Example I above, were dissolved in sufficient amounts of methyl alcohol to wet 200 grams of polyethylene resin which had been ground through a 0.020 inch herringbone screen in a Bantam Mikro-pulverizer. The solution was thoroughly blended with the ground resin and the blend was allowed to dry at room temperature for a sufficient period of time to permit volatilization of all of the methyl alcohol solvent.

Forty grams of the thus treated polyethylene resin were then fluxed and mechanically mixed into a homogeneous mass in a Plastograph mixer. For this purpose the Plastograph was maintained at a temperature of about 170° centigrade under pressure supplied through a pressure ram and with the mixer blades being driven by a drive rotating at 50 revolutions per minute. Nitrate-treated polyethylene was removed from the Plastograph after about 10 minutes of mechanical working under these conditions. About 40 grams of untreated polyethylene were worked up in the same manner. Twelve to thirteen gram portions of the treated and untreated polyethylene thus worked up were pressed into 0.025 inch sheets in a hydraulic press operating at about 170° centigrade and 5000 pounds per square inch, gauge. The samples were maintained at these conditions for about two mintutes, cooled to about room temperature while maintaining the pressure specified, and then removing from the press.

Samples of the size previously specified were die-cut from the pressed sheets and exposed in the Fade-Ometer which was operated with wicks dipped in deonized water, with all baffles in place and at a black panel temperature of about 125° Fahrenheit. Under these conditions the untreated control samples failed after 660 hours. The sample of polyethylene treated with cupric ammonium nitrate did not fail until it had been exposed for 2920 hours. The stability ratio, defined as the hours to failure for the treated resin divided by hours to failure for the untreated resin, was 4.4.

EXAMPLE VII

*Light stabilization of polyethylene with ceric ammonium nitrate*

Two grams of ceric ammonium nitrate, prepared in a manner similar to that described in Example I, were dissolved in sufficient methyl alcohol to wet 100 grams of polyethylene resin which had been ground through a 0.020 inch herringbone screen in a Bantam Mikro-pulverizer. The solution was thoroughly blended with the ground resin and then the blend was allowed to dry at room temperature until all of the methyl alcohol solvent had been removed. Forty-five grams of the thus treated polyethylene were mechanically worked into a homogeneous mass by manually milling for about three to five minutes on a hot plate maintained at a temperature in the range of from about 180° centigrade to about 190° centigrade. Manual milling consists of repeated spreading of the polyethylene into a thin sheet, rolling the sheet into a compact ball or roll, and respreading into a thin sheet. It thus approximates the mechanical mixing obtained through use of a two-roll mill. A portion of untreated polyethylene was worked up in the same manner.

Twelve to thirteen gram portions of the mechanically worked, treated and untreated polyethylene were then pressed into 0.025 inch sheets in the same manner as described in Example VI except that the temperature of the hydraulic press during the initial two-minute period was about 160° centigrade.

Samples were die-cut from the pressed sheets and exposed in the Fade-Ometer under the same conditions specified in Example VI. The untreated polyethylene failed in 900 hours while the polyethylene treated with ceric ammonium nitrate did not fail until it had been exposed for 2500 hours. The calculated stability ratio thus was about 2.8.

EXAMPLES VIII–XXXIV

*Light stabilization of polyethylene with various metal nitrates and metal ammonium nitrates*

In the following examples, various amounts of metal nitrate or metal ammonium nitrate were thoroughly blended with polyethylene resin and the blend mechanically worked into a homogeneous mass in a Plastograph operated under the conditions set forth in Example VI above. Samples were die-cut from 0.025 inch pressed sheets prepared in the manner described in Examples VI and VII and exposed in the Fade-Ometer at a black panel temperature of about 125° Fahrenheit, with all baffles in place, and with wicks dipped in deionized water. In each instance, a sample of untreated polyethylene prepared in the same manner as the treated polyethylene sample was exposed together with the treated sample in order to obtain a direct comparison. Results of these tests are summarized in Table I below. The stability ratio shown is the ratio of Fade-Ometer hours to failure for the nitrate-treated polyethylene to Fade-Ometer hours to failure of the untreated polyethylene.

TABLE I.—LIGHT STABILIZATION OF POLYETHYLENE

| Ex. | Nitrate Added | Weight Percent of Nitrate (Based on Weight of Polyethylene) | | | |
|---|---|---|---|---|---|
| | | 0.25 | 0.50 | 1.0 | 2.0 |
| | | Stability Ratio | | | |
| 8 | Cupric Nitrate | | | *2.5 | 3.1 |
| 9 | Zinc Nitrate | | | *2.3 | 2.5 |
| 10 | Aluminum Nitrate | | | *2.3 | 2.0 |
| 11 | Manganous Nitrate | | | *4.6 | 2.5 |
| 12 | Cobalt Nitrate | | | 3.7 | |
| 13 | Ferric Nitrate | | | 4.0 | |
| 14 | Ammonium Nitrate | | 1.5 | | |
| 15 | Manganous Cerous Nitrate | | 7.1 | | |
| 16 | Aluminum Cerous Nitrate | | 3.0 | | |
| 17 | Nickel Cerous Nitrate | | | *6.0 | |
| 18 | Cupric Cerous Nitrate | | 3.0 | | |
| 19 | Cobaltous Cerous Nitrate | | 2.0 | | |
| 20 | Aluminum Ammonium Nitrate | *2.5 | *2.4 | *2.0 | |
| 21 | Zinc Ammonium Nitrate | *2.4 | *3.2 | *2.2 | |
| 22 | Ceric Ammonium Nitrate | *2.6 | *2.2 | *2.8 | *2.6 |
| 23 | Cobaltous Ammonium Nitrate | | *2.7 | *3.0 | |
| 24 | Ferric Ammonium Nitrate | *2.7 | *5.3 | *5.4 | |
| 25 | Manganous Ammonium Nitrate | | *5.1 | *5.7 | |
| 26 | Nickel Ammonium Nitrate | | | 3.0 | 3.0 |
| 27 | Cupric Ammonium Nitrate | *2.7 | *3.8 | *3.0 | |
| 28 | Rare Earth [1] Ammonium Nitrate | | 2.4 | *2.5 | |
| 29 | Lanthanum Ammonium Nitrate | | | | 2.9 |
| 30 | Neodymium Ammonium Nitrate | | | | 2.8 |
| 31 | Rare Earth [2] Ammonium Nitrate | | 1.5 | 1.5 | |
| 32 | Cupric Diisopropanolamine Nitrate | *6.4 | *8.5 | *11.4 | *12.1 |
| 33 | Cupric Triisopropanolamine Nitrate | 7.1 | 10.0 | 11.0 | 11.0 |
| 34 | Nickel Diisopropanolamine Nitrate [3] | | | >6 | >3 |

*Average results of a plurality of determinations. In some instances up to 10 duplicate runs have been made.
[1] Cerium not removed.
[2] Cerium-free rare earths.
[3] Tests are still in progress for the evaluation of nickel di- and trisopropanolamine nitrates.

What is claimed is:

1. A light, stable polyethylene composition comprising polyethylene and a light stabilizing amount of a member of the group consisting of cupric diisopropylamine nitrate, cupric triisopropylamine nitrate, and manganous cerous nitrate.

2. A light stable polyethylene composition comprising polyethylene and from about 0.25 to about 2.5 percent by weight based on the weight of the polyethylene of cupric diisopropylamine nitrate.

3. A light stable polyethylene composition comprising polyethylene and from about 0.25 to about 2.5 percent by weight based on the weight of the polyethylene of manganous cerous nitrate.

References Cited by the Examiner

UNITED STATES PATENTS

| 2,491,444 | 12/49 | Cox et al. | 260—45.9 |
| 2,879,257 | 3/59 | Walter et al. | 260—45.75 |
| (U.S. Equivalent of Canada, 573,127) | | | |
| 2,960,489 | 11/60 | Gabler et al. | 260—45.75 |
| 2,964,495 | 12/60 | Newland et al. | 260—45.75 |
| 2,985,617 | 5/61 | Salyer et al. | 260—45.7 |

FOREIGN PATENTS

| 453,740 | 12/48 | Canada. |
| 573,127 | 3/59 | Canada. |
| 767,897 | 2/57 | Great Britain. |

LEON J. BERCOVITZ, *Primary Examiner.*

MILTON STERMAN, *Examiner.*